Feb. 1, 1966 U. CASSANMAGNAGO 3,232,540
SPRAY GUN FOR TWO-COMPONENT PAINTS, WITH SEPARATE
CONCENTRICAL NOZZLES
Filed June 16, 1964
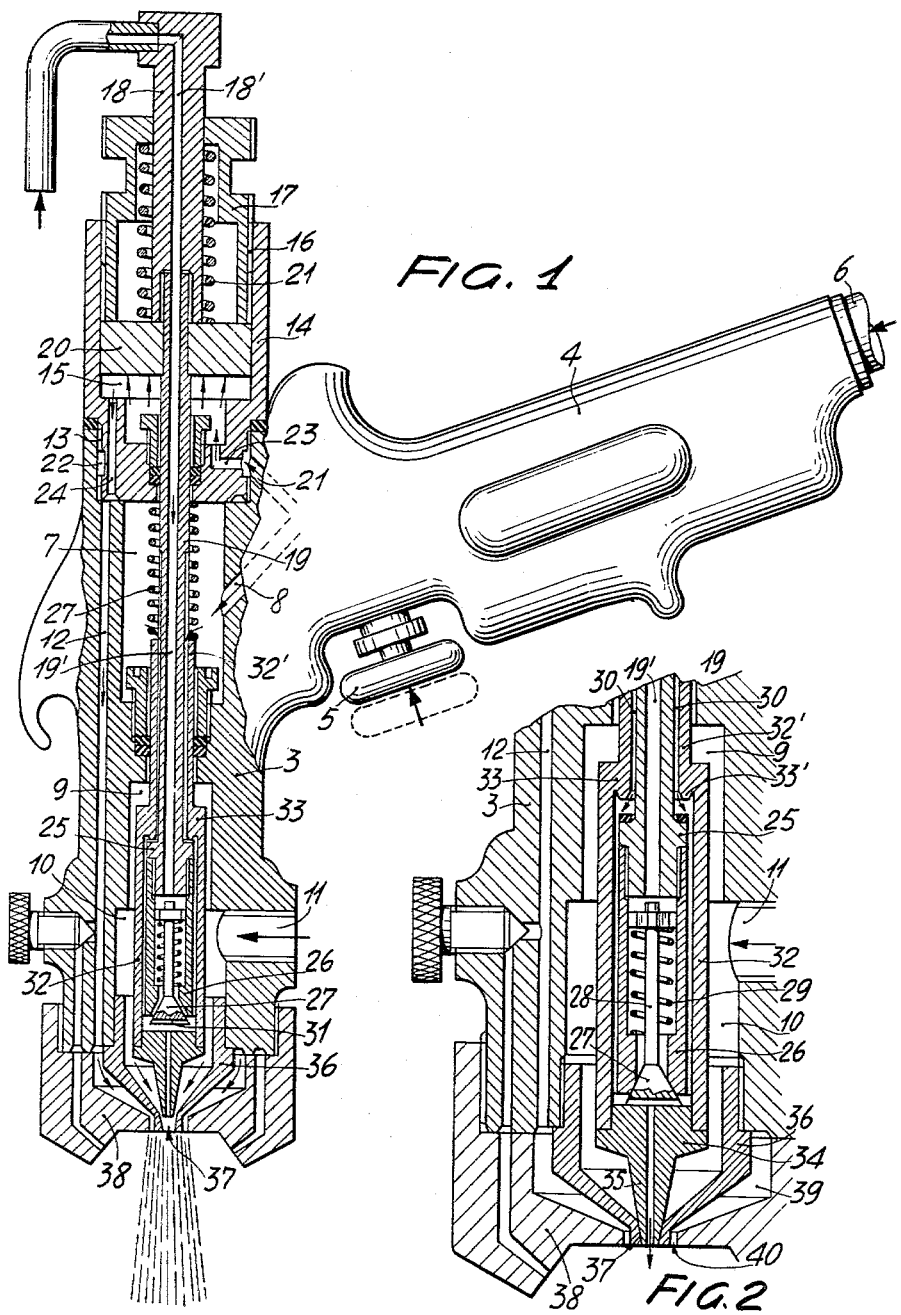
INVENTOR.
UGO CASSANMAGNAGO
BY
OSTROLENK, FABER, GERB & SOFFEN
ATTORNEYS United States Patent Office 3,232,540
Patented Feb. 1, 1966

3,232,540
SPRAY GUN FOR TWO-COMPONENT PAINTS, WITH SEPARATE CONCENTRICAL NOZZLES
Ugo Cassanmagnago, Via E. Toti angolo Via Oberdan, Bareggia di Macherio, Milan, Italy
Filed June 16, 1964, Ser. No. 375,542
Claims priority, application Italy, July 17, 1963, 14,899/63
7 Claims. (Cl. 239—416)

The present invention relates to a spray gun particularly suitable for using two-component synthetic paints: the synthetic paint and a hardening liquid, usually called "catalyst," and especially in those instances where these two components do not have to be mixed before atomizing.

Accordingly, the spray gun according to the invention, foresees separate inner ducts for the compressed air, for the paint, and for the liquid catalyst: it foresees three coaxial nozzles arranged as follows: the nozzle for the liquid catalyst, in the center; a second concentrical nozzle for the paint circularly surrounding the first nozzle; the third nozzle, represented by an annular slit, encircling the second nozzle, to supply the compressed air. There are also foreseen the outer conduits conveying: the liquid catalyst to a central duct, and hence to the nozzle, over a cut-off valve to be closed when the work is finished; the paint to the annular chamber in the back of the nozzle; and the compressed air to a system of chambers and ducts, wherein the movements of rods and pistons will operate the opening of the nozzle and thus, automatically, the starting of the equipment supplying the spray gun.

It is known that the liquid catalyst, because of its very fluid nature, tends to volatilize and disperse if the nozzle is located externally, that is if its atomizing should occur outside of the paint jet, since an outer circular cloud would not come in contact with the paint, and would disperse in the air. This inconvenience results of course in a modification of the quantitative ratio between paint and catalyst at the time of its deposition on the surface to be sprayed; such a modification might reach unwanted effects on the quality of the paint coating itself. A second noxious consequence would affect the people carrying out the work since the catalyst dispersion in the air would be inhaled and this would cause remarkable harm due to the toxic qualities of the liquid.

In the spray gun according to the invention, the catalyst central jet is surrounded by the circular paint jet, and the two components have to get necessarily mixed, with the aid of the third jet of air, without any chance that the catalyst may escape a total mixing with the paint.

The solution foreseeing three separate ducts, assuring the sharp separation of the two components, excludes any possibility of clogging or obstructing the inner duct paths, assuring that the spray gun is always in perfect working conditions, and does not need frequent washings.

An additional air supply is also provided to the chamber ahead of the catalyst nozzle, where the cut-off of the catalyst duct occurs upon the end of the work, by means of a valve; this supplementary air flows through said chamber and nozzle only during the pauses in working, bringing about the evacuation of any remaining liquid, with the great advantage of always keeping free the final section of the duct.

Thanks to the above mentioned features, it is possible to state that this spray gun is apt to operate indefinitely without stoppages; and to resume again its operation after eventual pauses, without need of flushing.

In the more detailed following description reference shall be made to the attached drawing wherein there is diagrammatically represented an embodiment of the invention, which however cannot be intended as a limiting one, since obviously both in its ensemble and in its details, the construction thereof can be modified, altered, improved or simplified, every variant falling of course in the field of protection of this patent. The drawing represents:

In FIGURE 1 a longitudinal section of the complete spray gun in its working position;

In FIGURE 2 a partial section of the front portion, at an enlarged scale, and in the closed position.

The spray gun includes: the body 3, that is joined to its grip 4, whereon there is the control member 5; and wherein arrives the hose 6 of the compressed air. The body 3 has inside: the central chamber 7 wherein mounts the air duct 8; downstream, a first chamber 9 and its larger diameter extension 10, to which arrives the paint through the duct 11; the body 3 is further run through by at least one duct 12, from one end to the other, and at its upstream end has a threaded tap 13 wherein there is screwed the rear end cylinder 14; this cylinder has inside a cylindrical recess 15, at the mouth whereof there is screwed the bush 17, through which extends axially the cylindrical piece 18, having a longitudinal duct 18', for feeding the liquid catalyst. Inside the piece 18 there is screwed a small pipe 19 which by its screwing helps in fixing between itself and the head of the piece 18, the piston 20, that is apt to move inside the cylindrical chamber 15, its travel being limited and adjusted by the position of the bush 17, but steadily urged downstream by the presence of the spring 21', compressed inside the bush itself.

The compressed air arrives into the chamber 15 from the duct 21, that mounts in the annular duct 22, and hence to the L-shaped duct 23. From the chamber 15 the air flows then through the duct 24 to the already mentioned duct 12.

The small pipe 19, establishing with its axial bore 19' a continuous path to the duct 18, runs through the bottom of the cylinder 14, the chamber 7, the body 3, terminating in the chamber 9, where it has a small flange 25, provided up-stream with a packing and, at its end, a threaded tap to receive the valve tubular body 26, wherein plays the conical head 27, whose stem is surrounded by the spring 29 tending to keep the valve closed, against the thrust of the liquid flowing from 19'. The small pipe 19 has further on its downstream half portion, longitudinal grooves 30 that are also provided on the periphery of the flange 25, and at least a diametrical slot 31 is also foreseen on the head of the conical piece 27.

The end portion of the small pipe 19 and the valve 26–27 are surrounded by a cylindrical body 32, closing in against the flange 25 and presenting in this annular shoulder a sealing seat 33' against the packing of the flange itself.

The narrow up-stream section 32' extends up to the chamber 7 and between this section and the bottom of the piece 14 there is compressed the spring 27, while at the opposite end the cylindrical body 32 carries the nozzle 34 terminating with a very thin frustum shaped spout 35.

At the front end of the body 3 there is screwed on the nozzle 36 which, reducing the diameter of the chamber 10, surrounds the nozzle 34, and has a conical bore 37 wherein the tip of the spout 35 of the nozzle 34 can fit perfectly tight. The third nozzle 38 rounds in turn the nozzle 34, it too being screwed on the forward outer end of the body 3, and the annular chamber 39 thus formed therebetween shrinks into the circular outlet slit 40; air arrives to the chamber 39 from the duct(s) 12, while to the nozzle 37 arrives the paint from the chamber 10.

The liquid catalyst arrives axially from the duct 19'-18' to the nozzle 35 through the valve 26.

A second path of compressed air, coming from the conduit 8 into the chamber 7, passes through the longitudinal grooves 30 of the small pipe 19; and when the gun is in operation (FIGURE 1) it is stopped at the packing 33', while when the spray gun is inactive (FIGURE 2) it flows through the annular space between the pieces 26-32 and, through the diametrical slot in the valve head 27 flows to the nozzle 34 and to the outside.

The passage of the various members from a state of rest to the operating state and vice-versa occurs in the following way; gripping the spray gun, the operator pushes the button 5 (FIGURE 1), air enters the chamber 15, flowing through 21, and pushes the piston 20, against the action of the spring 21, to about against the bush 17 in the position of maximum opening; the piston 20 drags with it the small pipe 19 and the cylindrical piece 32, this last one against the action of the spring 27 aiding the sealing against the gasket 33', and with the piece 32, also the nozzle 34 that opens the nozzle 37 of the resin paint. With the withdrawal of the small pipe 19 and of the valve body 26, the pressure in the conduit 19' of the liquid catalyst overcomes the opposition of the valve spring 29 and this last one, moving down-stream, frees the way to the liquid. Simultaneously the air in the chamber 15, through the ducts 24 and 12 arrives into the chambers 39 and to the annular nozzle 40. The air that was flowing from the conduit 8 to the chamber 7, finding its path cut-off at the packing 33', stops into the longitudinal ducts 30, so that the air body flows now only through the conduit 21 to maintain a pressure on the piston 20 and to feed the jet through the nozzle 40.

By relieving the pressure on the button 5 (FIGURE 2) and with the pressure against the piston 20 falling, and the spring 21 overcoming the reduced pressure, the piston will move down-stream together with the small tube 19 and the valve 26; the valve head 27 will seat against the nozzle 34 and the valve body against the valve itself so as to cut-off the flow of the fluid catalyst and of the resin since the conical point 35 will close the nozzle 37. Simultaneously the gasket 33' will unseat and air will flow through the longitudinal grooves 30 from the chamber 7 to the nozzle 34-35 and hence to the outside.

What is claimed is:

1. A spray gun for two-component paints or the like, comprising, a body member having a plurality of concentrical nozzles at one end thereof, said body member having first, second and third hollow chambers therein, said first and second chambers having conduit entrance means for the flow of air therein, said body member including first duct means communicating with said first chamber and an outer one of said plurality of concentrical nozzles when said spray gun is being operated, and second duct means communicating with said second chamber and an inner one of said concentrical nozzles when said spray gun is inoperative, said third chamber having conduit entrance means for the flow of a first liquid therein, said third chamber communicating with an intermediate one of said concentrical nozzles when said spray gun is being operated;

said body member including third duct means communicating with a source of a second liquid and said inner one of said concentrical nozzles when said spray gun is being operated;

and piston means located in said first chamber and normally biased toward a first position in said body member for blocking said first and third duct means, opening said second duct means, and isolating said third chamber from said intermediate nozzle;

the introduction of a predetermined pressure of compressed air into said first chamber being sufficient to move said piston means to a second position to open said first and third duct means, close said second duct means, and reestablish communication of said intermediate nozzle and said first chamber.

2. The spray gun of claim 1, wherein said third duct means comprises a hollow pipe extending centrally through said first and second chambers, said pipe being secured to and movable with said piston means, one end of said pipe communicating with the exterior of said body member for the reception of said second liquid, the opposite end of said pipe residing in said third chamber and terminating in a valve member normally biased to close said opposite end of said pipe when said piston means is in its first position.

3. The spray gun of claim 2, wherein said valve member is slotted at one end thereof and wherein said second duct means includes a hollow cylindrical body surrounding said opposite end of said pipe, said cylindrical body having a tapered nozzle at one end thereof which resides within said intermediate nozzle and forms said inner nozzle, said cylindrical body being moved by said pipe in response to movement of said piston means from its first to its second position to a first position wherein mating portions of said pipe and cylindrical body isolate the interior of said cylindrical body from said second chamber, said cylindrical body being normally biased toward a second position in which said mating portions are disengaged and air in said second chamber communicates with said tapered nozzle through said slotted valve member.

4. A spray gun for two-component paints or the like, comprising:

a body member having a plurality of concentrical nozzles at one end thereof, said body member having first, second and third hollow chambers therein, said first and second chambers having conduit entrance means for the flow of air therein, said body member including first duct means communicating with said first chamber and an outer one of said plurality of concentrical nozzles, said third chamber communicating with an intermediate one of said plurality of concentrical nozzles and having conduit entrace means for the flow of a first liquid therein;

piston means located in said first chamber and normally biased toward said first end of said body member to isolate said first duct means from said first chamber;

a hollow pipe extending centrally through said first and second chambers, said pipe being secured to and movable with said piston means, one end of said pipe communicating with the exterior of said body member for the reception of a second liquid into said hollow pipe, the opposite end of said pipe residing in said third chamber and terminating in a slotted valve member normally biased to close said opposite end of said pipe;

a hollow cylindrical body surrounding said opposite end of said pipe, said cylindrical body having a tapered nozzle at one end thereof which resides within said intermediate concentrical nozzle, said cylindrical body being moved by said pipe in response to movement of said piston means caused by the introduction of compressed air into said first chamber to a first position wherein a mating portion of said pipe and cylindrical body isolate the interior of said cylindrical body from said second chamber, said cylindrical body being biased toward a second position in which said mating portions are disengaged and air in said second chamber communicates with said tapered nozzle through said slotted valve member.

5. The spray gun of claim 4, wherein said tapered nozzle of said hollow cylindrical body seats within said intermediate nozzle to block the flow of said first liquid therethrough when said cylindrical body is moved to its second position.

6. The spray gun of claim 4, wherein said cylindrical body has a cylindrical stem at its opposite end thereof which extends into said second chamber, and said pipe includes a slot which communicates with said second chamber, the slotted valve member, and said tapered nozzle when said cylindrical body is in its second position.

7. The spray gun of claim 6, wherein said pipe is provided with an outstanding flange which interferes with said cylindrical body to close one end of said slot when said cylindrical body is being moved to its first position by said pipe.

References Cited by the Examiner

UNITED STATES PATENTS

| | | |
|---|---|---|
| 2,265,209 | 12/1941 | Thompson. |
| 2,864,653 | 12/1958 | Liedberg et al. |
| 2,958,471 | 11/1960 | Zippel _____ 239—416 |
| 2,971,700 | 2/1961 | Peeps. |
| 3,059,859 | 10/1962 | Hupp _____ 239—415 |
| 3,066,874 | 12/1962 | Becker _____ 239—416 |
| 3,074,651 | 1/1963 | Agosti et al. _____ 239—424 |

M. HENSON WOOD, JR., *Primary Examiner.*

RAYMOND S. STROBEL, *Assistant Examiner.*